United States Patent
Hong et al.

(10) Patent No.: US 9,679,611 B2
(45) Date of Patent: Jun. 13, 2017

(54) METHOD FOR DISPLAYING STATUS ASSOCIATED WITH A STORAGE DEVICE, COMPUTER SYSTEM AND STATUS-MONITORING DEVICE THEREOF

(71) Applicant: MiTAC Computing Technology Corporation, Hsinchu (TW)

(72) Inventors: Yi-Hao Hong, Hsinchu (TW); Che-Wei Chang, Hsinchu (TW); Chi-Hsing Wang, Hsinchu (TW); Hsin-Ta Huang, Hsinchu (TW)

(73) Assignee: MITAC COMPUTING TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 14/868,077

(22) Filed: Sep. 28, 2015

(65) Prior Publication Data

US 2017/0092336 A1 Mar. 30, 2017

(51) Int. Cl.
| | |
|---|---|
| *G06F 3/06* | (2006.01) |
| *G11B 33/10* | (2006.01) |
| *G08B 21/18* | (2006.01) |
| *G08B 5/22* | (2006.01) |
| *G06F 13/38* | (2006.01) |

(52) U.S. Cl.
CPC ............. *G11B 33/10* (2013.01); *G08B 5/22* (2013.01); *G08B 21/18* (2013.01)

(58) Field of Classification Search
None
See application file for complete search history.

(56) References Cited

U.S. PATENT DOCUMENTS

2011/0214126 A1   9/2011   Sadovsky
2012/0272097 A1*  10/2012  Wang ................. G06F 11/1092
                                              714/6.22

FOREIGN PATENT DOCUMENTS

| TW | I339391 B  | 3/2011 |
| TW | 201423396 A | 6/2014 |
| TW | 201423742 A | 6/2014 |
| TW | I482017 B  | 4/2015 |

OTHER PUBLICATIONS

Search Report mailed Nov. 12, 2015, issued in counterpart Taiwanese Patent Application No. 104114047, filed May 1, 2015, 2 pages.

* cited by examiner

*Primary Examiner* — Scott Sun
(74) *Attorney, Agent, or Firm* — Christensen O'Connor Johnson Kindness PLLC

(57) ABSTRACT

A method implemented by a status-monitoring device connected between a storage device and a corresponding output unit includes: a) determining presence of a storage device according to a first packet from the storage device; b) when it is determined that the storage device is present, generating a pulse signal according to a second packet from the storage device; c) generating a driving signal indicating a status associated with the storage device according to at least a logic level of the pulse signal; and d) sending the driving signal to the output unit for driving the output unit to output an output signal indicating the status.

13 Claims, 4 Drawing Sheets

METHOD FOR DISPLAYING STATUS ASSOCIATED WITH A STORAGE DEVICE, COMPUTER SYSTEM AND STATUS-MONITORING DEVICE THEREOF

FIELD

The disclosure relates to a method for displaying status associated with a storage device.

BACKGROUND

In a server computer utilizing a disk array, it is necessary to monitor status associated with each of multiple hard disks in the disk array and to notify a user of abnormality of the hard disks. Generally, the status associated with a hard disk can be categorized into an idle status, an access status, a fault status, an offline status and a non-present status.

Referring to FIG. 1, a conventional method for displaying status associated with storage devices such as hard disks 13 is implemented by a conventional status-monitoring device including a serial attached SCSI (SAS) controller 11, an SAS expander 12, a plurality of buffers 14 and a plurality of lighting units 15. The SAS expander 12 is electrically connected among the SAS controller 11 and the hard disks 13, and includes a plurality of sets of communication ports. Each set of communication ports includes three communication ports, two of which are electrically connected to a corresponding one of the buffers 14, and the remaining one of which is electrically connected to a corresponding one of the lighting units 15. The buffers 14 are further electrically connected to the lighting units 15, respectively.

By virtue of the SAS expander 12 that communicates with the hard disks 13 and that is operable to output a driving signal indicating the status associated with each of the hard disks 13 to one of the lighting unit 15 that corresponds to the hard disk 13 via one of the buffers 14 that corresponds to the hard disk 13, the lighting unit 15 is disabled or enabled to flash or continuously emit light. As a result, the user is notified of the status associated with each of the hard disks 13.

However, in this conventional system, each hard disk 13 requires use of three communicating ports, two of which are respectively dedicated to sending a normal status signal (either idle or access status) and a non-present status signal associated with the hard disk 13 to the corresponding lighting unit 15 through the corresponding buffer 14, and the remaining one of which is dedicated to sending an abnormal status signal (either fault or offline status) associated with the hard disk 13 directly to the corresponding lighting unit 15. That is to say, the number of the communicating ports is three times the number of the hard disks 13, which results in a relatively complicated configuration of the conventional status-monitoring device. Further, the physical circuit arrangements between each buffer 14 and the corresponding lighting unit 15 are troublesome to implement.

SUMMARY

Therefore, an object of the disclosure is to provide a method for displaying status associated with a storage device that can alleviate at least one of the drawbacks of the prior art.

According to one aspect of the present disclosure, a method for displaying a status associated with a storage device, the method to be implemented by a status-monitoring device that is electrically connected between the storage device and an output unit corresponding to the storage device, the method includes:

a) determining the presence of the storage device according to a first packet from the storage device;

b) when it is determined that the storage device is present generating a pulse signal according to a second packet from the storage device;

c) generating a driving signal indicating the status associated with the storage device according to at least a logic level of the pulse signal; and d) sending the driving signal to the output unit for driving the output unit to output an output signal indicating the status associated with the storage device according to the driving signal.

According to another aspect of the disclosure, there is provided a status-monitoring device for displaying a status associated with a storage device. The status-monitoring device includes a logic unit and an expansion unit. The logic unit is configured to receive a first packet indicating presence of the storage device and outputted by the storage device, and is to determine the presence of the storage device according to the first packet. The expansion unit is electrically connected to the logic unit, and is configured to receive from the storage device a second packet indicating whether the storage device is in an abnormal status when the storage device is present, and is to generate a pulse signal according to the second packet. The logic unit is further configured to be coupled to an output unit corresponding to the storage device, to receive the pulse signal from the expansion unit, to generate a driving signal indicating the status associated with the storage device according to at least a logic level of the pulse signal, and to send the driving signal to the output unit for driving the output unit to output an output signal indicating the status associated with the storage device according to the driving signal.

According to still another aspect of the disclosure, a computer system includes a storage device, a status-monitoring device, and an output unit. The storage device is operable to output a first packet indicating presence of the storage device, and a second packet indicating whether the storage device is in an abnormal status. The status-monitoring device includes a logic unit and an expansion unit. The logic unit is configured to receive the first packet from the storage device, and to determine the presence of the storage device according to the first packet. The expansion unit is electrically connected to the logic unit, and is configured to receive the second packet from the storage device when the storage device is present, to generate a pulse signal according to the second packet, and to send the pulse signal to the logic unit. The logic unit is further configured to generate a driving signal indicating whether the storage device is in an abnormal status according to a logic level of the pulse signal. The output unit corresponds to the storage device, is coupled to the logic unit for receiving the driving signal therefrom, and is operable to output an output signal indicating whether the storage device is in an abnormal status.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 2:
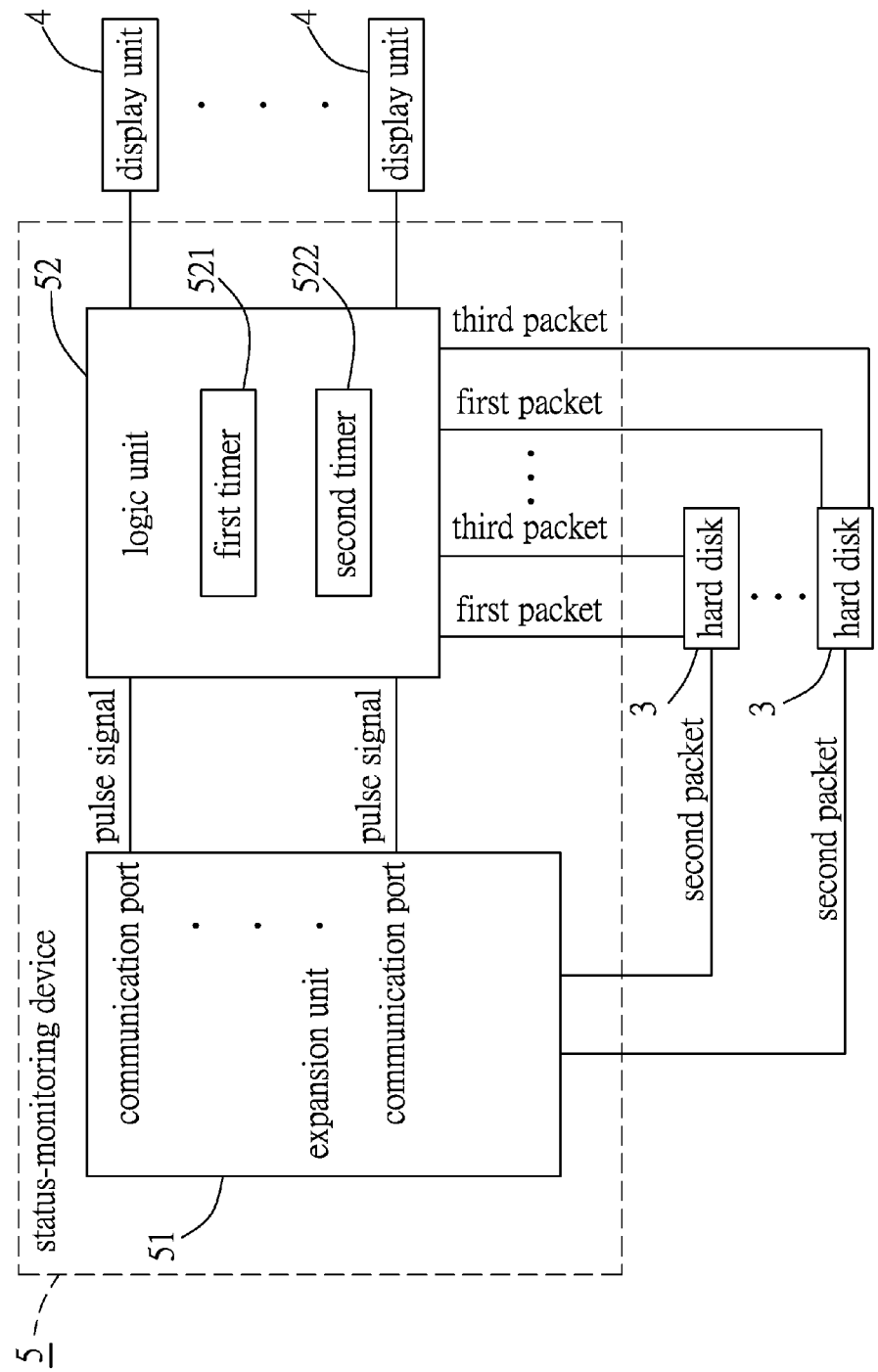
FIG. 2 is a schematic block diagram of a computer system according to an embodiment of the present disclosure.

Referring to FIG. 2, the computer system according to the embodiment of this disclosure includes a plurality of storage devices 3, a plurality of output units (for example but not limited to, display units 4) and a status-monitoring device 5. In this embodiment, the storage devices 3 are hard disks. It should be noted that the display units 4 correspond to the storage devices 3, respectively, and the correlation between the status associated with the storage device 3 and operation of the corresponding display unit 4 is identical among all corresponding pairs of the storage devices 3 and display units 4. Thus, only one of the display units 4 and the respective one of the storage devices 3 will be described in the following descriptions for the sake of brevity.

In this embodiment, the display unit 4 includes a green light LED and a red light LED (not shown) that are operable for indicating status associated with the storage device 3. Note that the disclosure is not limited to the color of the LEDs, nor is it limited to using the display unit 4 to implement the output unit.

The status-monitoring device 5 is electrically connected among the storage devices 3 and the display units 4, and includes an expansion unit 51 and a logic unit 52 that has first and second timers 521, 522. The expansion unit 51 includes a plurality of communication ports electrically connected to the logic unit 52 and corresponding to the storage devices 3, respectively. In this embodiment, the expansion unit 51 includes a serial attached small computer systems interface (SAS) controller and a SAS expander. The SAS expander is electrically connected to the SAS controller, and includes the communication ports. Note that the communication ports described herein conform to the specification of serial general purpose input/output (SGPIO) interface, and the disclosure is not limited in this respect.

The logic unit 52 includes a plurality of terminals electrically connected to the storage devices 3, respectively. Similarly, only one of the terminals and the corresponding storage device 3 will be described in the following for the sake of brevity.

In this embodiment, the logic unit 52 is implemented by a complex programmable logic device (CPLD), and the disclosure is not limited in this aspect. For example, the logic unit 52 may be a field programmable gate array (FPGA) in other embodiments.

Figure 3:
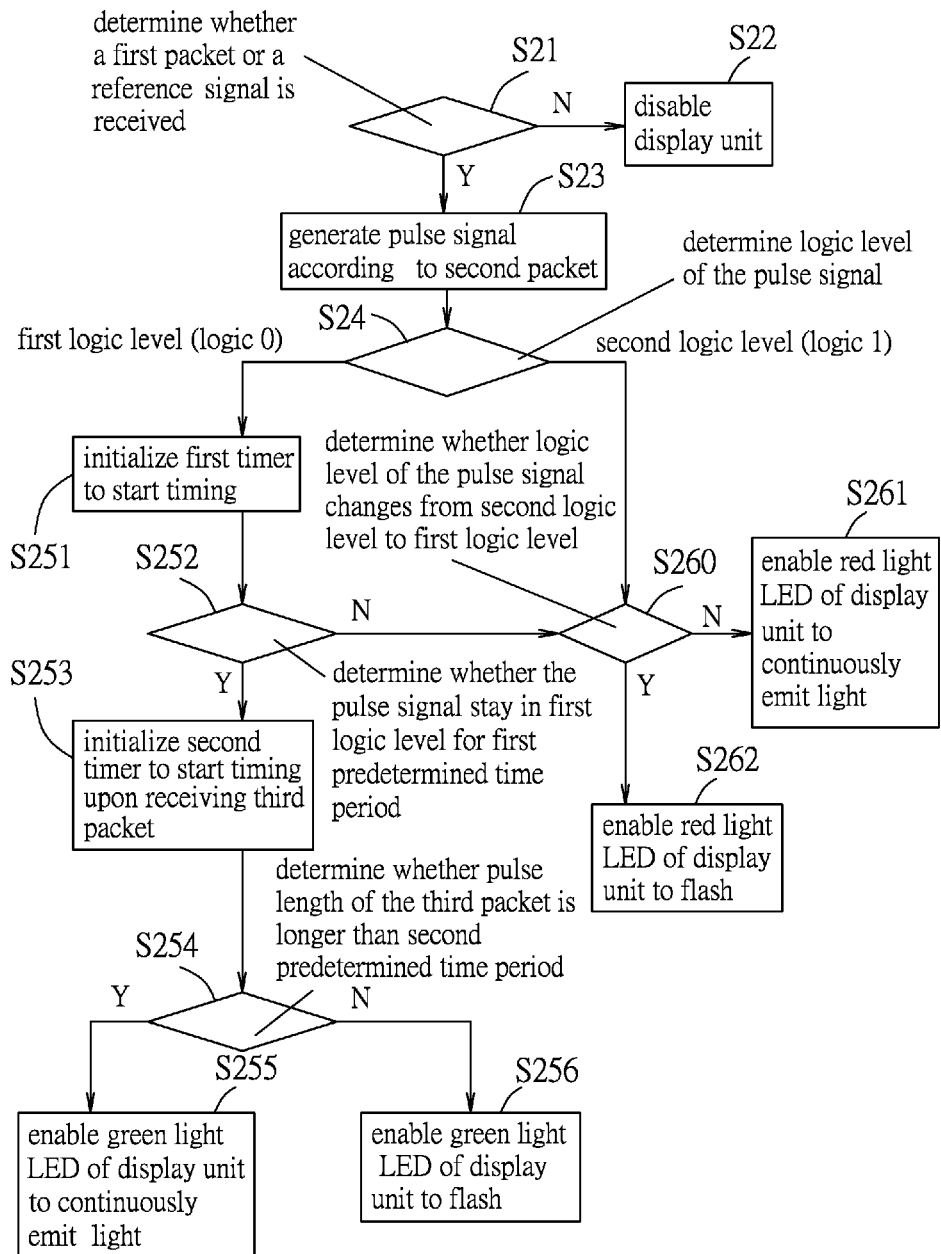
FIG. 3 is a flow chart of a method for displaying a status associated with a storage device according to an embodiment of the present disclosure.

Referring to FIGS. 2 to 3, the method for displaying a status associated with the storage device 3 to be implemented by the computer system according to the embodiment of this disclosure is illustrated hereinafter.

Before further description of this method, as shown in Table 1, the status associated with the storage device 3 and the corresponding operation of the display unit 4 are illustrated below.

TABLE 1

| | Status associated with storage device | | | | |
|---|---|---|---|---|---|
| | Non-Present | Fault | Offline | Idle | Access |
| Red light LED | Disable | Continuously emit light | Flash | Disable | Disable |
| Green light LED | Disable | Disable | Disable | Continuously emit light | Flash |

As shown in Table 1, the status associated with the hard disk 3 is categorized into an offline status, a fault status, an idle status, an access status and a non-present status. It should be noted that the presence of the storage device 3 represents that the storage device 3 is electrically connected to a slot on a backboard (not shown).

Further, the offline status and the fault status are each an abnormal status. The idle status and the access status are each a normal status.

FIG. 3 is a flow chart of a method for displaying the status associated with the storage device 3 implemented by the status-monitoring device 5 according to the embodiment.

In step S21, the logic unit 52 determines whether a first packet indicating presence of the storage device 3 or a reference signal is received at the terminal. In particular, the storage device 3 is configured to output the first packet when electrically connected to the terminal of the logic unit 52, and the terminal is configured to output the reference signal when the storage device 3 is not present. Note that in this embodiment, the first packet has a first electric potential, e.g., a low voltage level, and the reference signal has a second electric potential different from the first electric potential, e.g., a high voltage level.

When the reference signal is received, the flow goes to step S22. In step S22, the logic unit 52 generates a driving signal indicative of non-presence of the storage device 3 (i.e., the non-present status associated with the storage device 3), and sends the driving signal indicative of non-presence of the storage device 3 to the display unit 4 for disabling the display unit 4.

When the logic unit 52 determines that the first packet is received in step S21, the flow goes to step S23. In step S23, the expansion unit 51 generates a pulse signal according to a second packet received from the storage device 3.

In step S24, upon receipt of the pulse signal from the expansion unit 51, the logic unit 52 determines whether the pulse signal is currently at a first logic level or a second logic level.

The flow goes to step S26 when the pulse signal is at the second logic level, and goes to step S25 when otherwise. In this embodiment, the first logic level is logic 0 and the second logic level is logic 1.

In step S26, the logic unit 52 determines whether the logic level of the pulse signal changes from the second logic level (logic 1) to the first logic level (logic 0). When the determination made in step S26 is affirmative, the flow goes to step S262. In step S262, the logic unit 52 generates a driving signal indicating the offline status of the storage device 3 and sends the driving signal indicating the offline status of the storage device 3 to the display unit 4 for driving the red light LED of the display unit 4 to flash (i.e., the output unit outputs a first output signal).

On the other hand, when the logic unit 52 determines that the logic level of the pulse signal does not change from the second logic level to the first logic level, the flow goes to step S261. In step S261, the logic unit 52 generates a driving signal indicating the fault status of the storage device 3 and sends the driving signal indicating the fault status of the storage device 3 to the display unit 4 for driving the red light LED of the display unit 4 to continuously emit light (i.e., the output unit outputs a second output signal).

In step S25, the logic unit 52 further determines whether the storage device 3 is in the idle status or the access status. In this embodiment, step S25 includes sub-steps S251-S254.

In sub-step S251, upon determining that the pulse signal is at the first logic level in step S24, the logic unit 52 initializes a first timer 521 to start timing. Subsequently, in sub-step S252, the logic unit 52 determines whether the pulse signal stays at the first logic level for a first predetermined time period (e.g., 1.5 seconds). The flow goes to sub-step S253 when the determination made in sub-step S252 is affirmative, and goes to step S26 when the determination made in sub-step S252 is negative.

In sub-step S253, the logic unit 52 initializes a second timer 522 to start timing upon receiving a third packet from the storage device 3.

In sub-step S254, the logic unit 52 determines whether a pulse length of the third packet is longer than a second predetermined time period (e.g., 0.5 seconds).

The flow goes to step S255 when the determination made in sub-step S254 is affirmative, and goes to step S256 when the determination made in step 254 is negative.

In step S255, upon determining that the pulse length of the third packet is longer than the second predetermined time period, the logic unit 52 generates a driving signal indicative of the idle status of the storage device 3, and sends the driving signal indicative of the idle status of the storage device 3 to the display unit 4 for driving the green light LED of the display unit 4 to continuously emit light (i.e., the output unit outputs a third output signal).

In step S256, the logic unit 52 generates a driving signal indicative of the access status of the storage device 3, and sends the driving signal indicative of the access status of the storage device 3 to the display unit 4 for driving the green light LED of the display unit 4 to flash (i.e., the output unit outputs a fourth output signal).

In practice, the status-monitoring device 5 is configured to repeatedly implement the method when the computer system is powered on. Namely, the flow goes back to step S21 after each of steps S22, S255, S256, S261 and S262 is executed.

Figure 4:
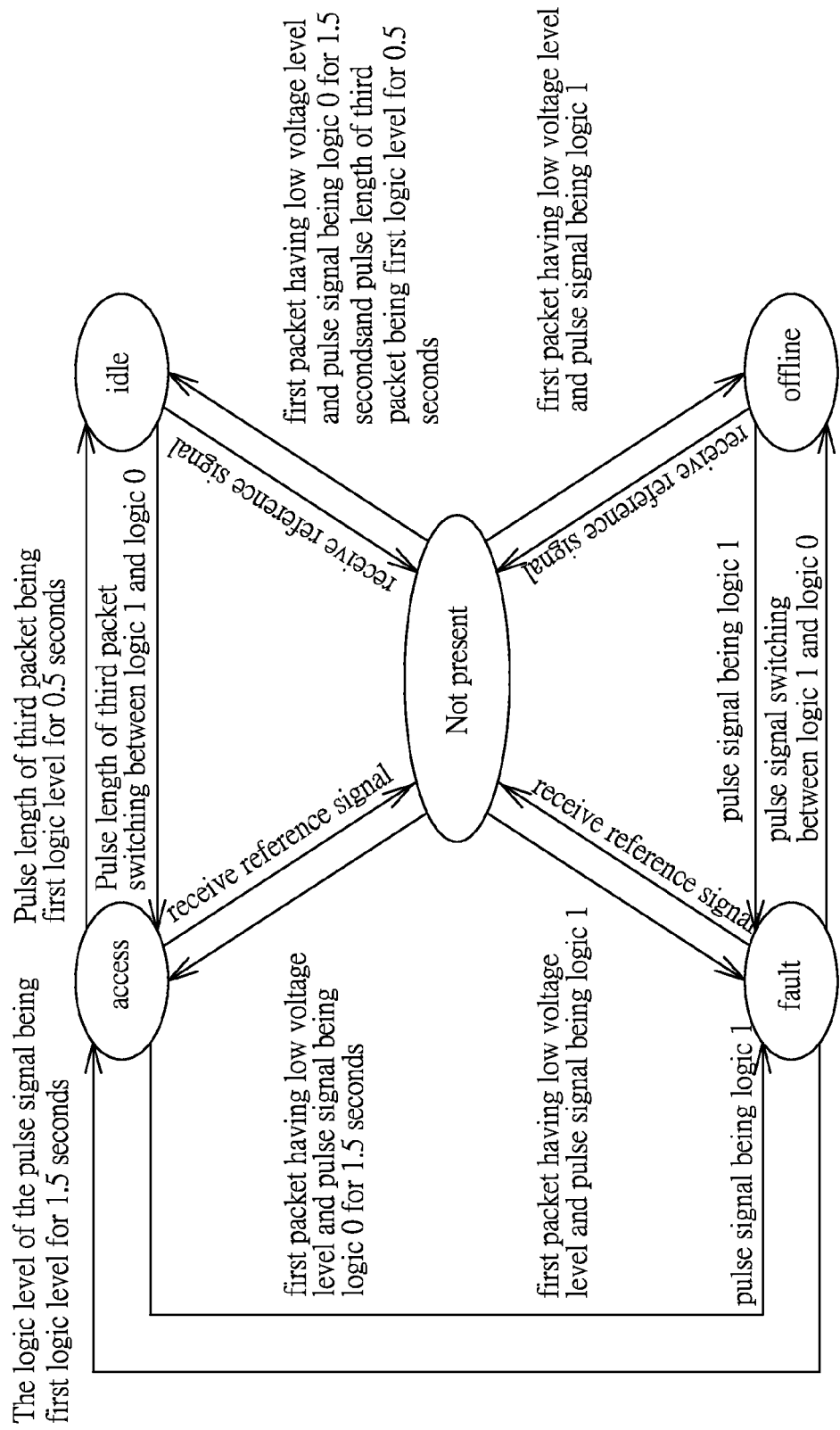
FIG. 4 illustrates status transitions in the method of FIG. 3.

Further referring to FIG. 4, a status transition diagram of the storage device 3 is illustrated. In this embodiment, the first logic level is logic 0 and the second logic level is logic 1. It should be noted that the invention is not limited in this aspect, and the embodiment may be varied according to different specifications of a hard disk without departing from the spirit and scope of this disclosure.

When the reference signal having the second electric potential, i.e., high voltage level, is received at the terminal, the logic unit 52 determines that the storage device 3 is not present and the display unit 4 is disabled, i.e., both the green light LED and the red light LED are disabled, to indicate that the storage device 3 is not present at this time.

When the first packet having the first electric potential, i.e., low voltage level, is received, and the logic level of the pulse signal derived from the second packet is at the first logic level (logic 0) for the first predetermined time (1.5 seconds), the storage device 3 is normally operated (either in the access status or the idle status) and only the green light LED of the display unit 4 is enabled. The normal statuses of the storage device 3 are illustrated in the upper portion of FIG. 4.

When the pulse length of the received third packet is longer than the second predetermined time period (0.5 seconds), the storage device 3 is in the idle status and the green light LED of the display unit 4 is driven to continuously emit light. When the pulse length of the received third packet is not longer than the second predetermined time period (0.5 seconds), the storage device 3 is in the access status and the green light LED of the display unit 4 is driven to flash.

Upon reception of the first packet having first electric potential, i.e., low voltage level, when either the logic level of the pulse signal is in the second logic level (logic 1) or when the pulse signal is in the first logic level (logic 0) for less than the first predetermined time, operation of the storage device 3 is abnormal (either in the fault status or the offline status) and only the red light LED of the display unit 4 is enabled. The abnormal statuses of the storage device 3 are illustrated in the lower portion of FIG. 4.

When the logic level of the pulse signal changes between the second logic level (logic 1) and the first logic level (logic 0), the status of the storage device 3 is in the fault status and the red light LED of the display unit 4 is driven to continuously emit light. When the logic level of the pulse signal remains in the second logic level (logic 1), the status associated with the storage device 3 becomes the offline status and the red light LED of the display unit 4 is driven to flash.

It should be noted that, when the pulse signal is at the first logic level (logic 0) for less than the first predetermined time (1.5 seconds), i.e., the logic level of the pulse signal transitions from the first logic level (logic 0) to the second logic level (logic 1) within 1.5 seconds, the storage device 3 is determined to be in the abnormal status. Since the first, second and third packets are continuously received when the storage device 3 is present, the logic unit 52 is capable of immediately detecting transitions in the status associated with the storage device 3 as depicted in FIG. 4 and to notify the user of the same.

Figure 1:
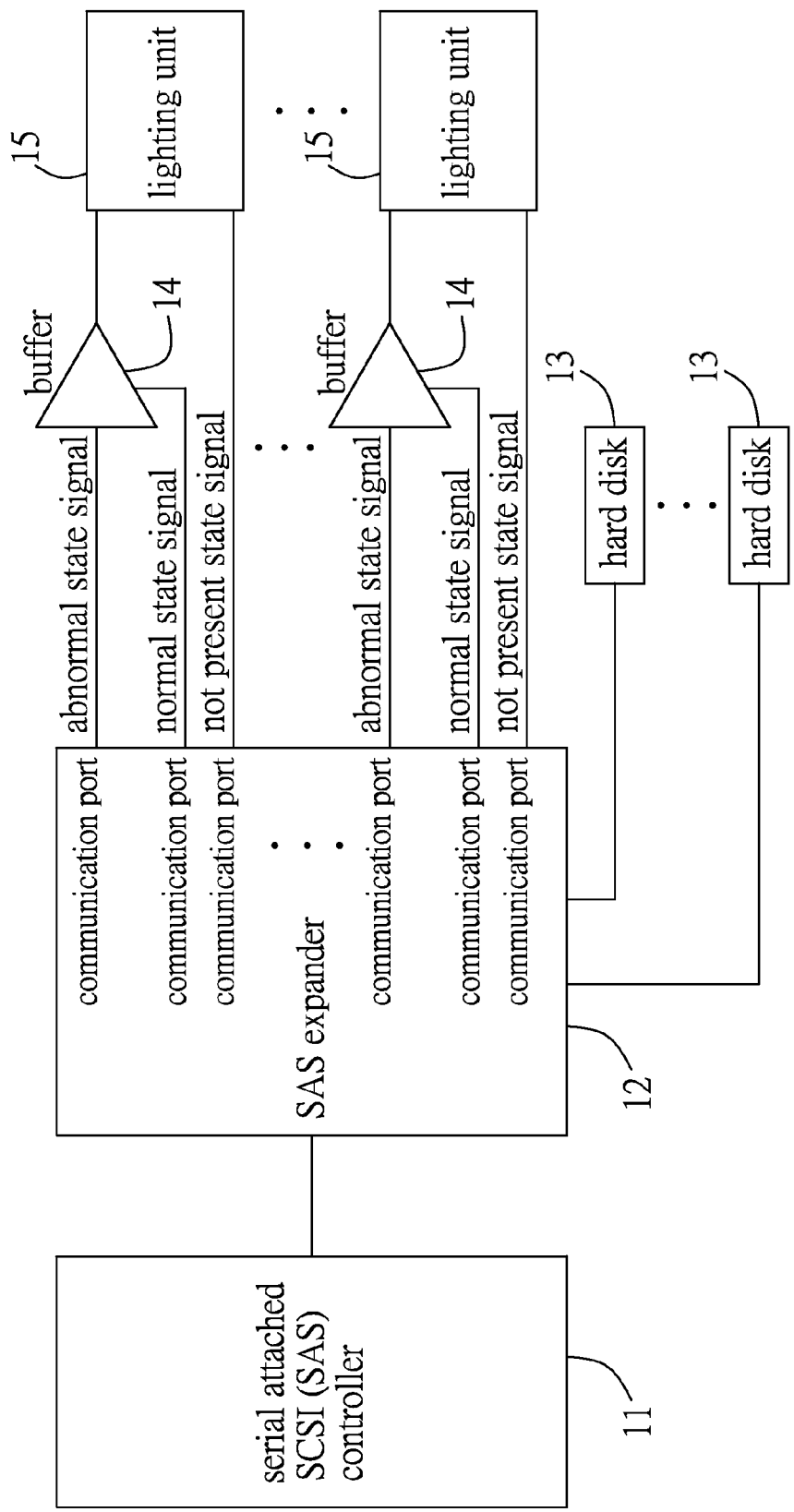
FIG. 1 is a schematic block diagram of a conventional status-monitoring device for implementing a conventional method for displaying status associated with storage devices.

To sum up, as compared to the conventional method and status-monitoring device illustrated in FIG. 1, in this disclosure, the number of the communication ports in the expansion unit 51 required to be used for the purpose of monitoring the statuses associated with the storage devices 3 is the same as the number of the storage devices 3, and thus, the remaining communication ports of the expansion unit 51 may be connected to other logic circuits for other purposes. Further, since the status associated with the storage devices 3 is determined by the logic unit 52, which is reprogrammable, the buffers 14 in FIG. 1 for logic determination can be omitted and thus the physical circuit arrangement for the computer system of this disclosure is relatively simple and the manufacturing cost is relatively low.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:
1. A computer system comprising:
   a storage device operable to output a first packet indicating presence of said storage device, and a second packet indicating whether said storage device is in an abnormal status;

a status-monitoring device including
  a logic unit configured to receive the first packet from said storage device, and to determine the presence of said storage device according to the first packet, and
  an expansion unit electrically connected to said logic unit, and configured to receive the second packet from said storage device when the storage device is present, to generate a pulse signal according to the second packet that indicates whether said storage device is in abnormal state, and to send the pulse signal to said logic unit,
  said logic unit being further configured to generate a driving signal indicating a status associated with the storage device according to at least a logic level of the pulse signal received from the expansion unit; and
  a light-emitting diode (LED) display unit corresponding to said storage device, coupled to said logic unit for receiving the driving signal therefrom, and operable to output an output signal by one of flashing and continuously emitting light for indicating the status associated with said storage device according to the driving signal.

2. The computer system of claim 1, wherein said logic unit includes a terminal electrically connected to said storage device, and is configured to determine the presence of said storage device when receiving at said terminal the first packet having a first electric potential, to generate a driving signal indicative of non-presence of said storage device when receiving at said terminal a reference signal having a second electric potential different from the first electric potential, and to send a driving signal indicative of non-presence of the storage device to said LED display unit for disabling said LED display unit.

3. The computer system of claim 1, wherein said logic unit is further configured to:
  determine whether the logic level of the pulse signal is a first logic level or a second logic level;
  when it is determined that the pulse signal is at the second logic level, determine whether the logic level of the pulse signal changes from the second logic level to the first logic level; and
  generate a driving signal indicating a fault status of said storage device and driving said LED display unit to output a first output signal when it is determined that the logic level of the pulse signal changes from the second logic level to the first logic level, and generate a driving signal indicating an offline status of said storage device and driving said LED display unit to output a second output signal when otherwise.

4. The computer system of claim 3, wherein said storage device is further operable to output a third packet indicative of a normal status thereof,
  wherein said logic unit is further configured to:
    when it is determined that the pulse signal is at the first logic level, determine whether the pulse signal is at the first logic level for a first predetermined time period; and
    receive the third packet from said storage device when it is determined that the pulse signal is at the first logic level for the first predetermined time period, and determine whether the logic level of the pulse signal changes from the second logic level to the first logic level when otherwise.

5. The computer system of claim 4, wherein said logic unit is further configured to:
  determine whether the third packet has a pulse length longer than a second predetermined time period;
  when it is determined that the pulse length of the third packet is longer than the second predetermined time period, generate a driving signal indicative of an idle status of said storage device, and send the driving signal indicative of the idle status to said LED display unit for driving said LED display unit to output a third output signal; and
  when it is determined that the pulse length is not longer than the second predetermined time period, generate a driving signal indicative of an access status of said storage device, and send the driving signal indicative of the access status of said storage device to said LED display unit for driving said LED display unit to output a fourth output signal.

6. The computer system of claim 1, wherein said storage device is a hard disk.

7. The computer system of claim 1, wherein said LED display unit includes a green light LED and a red light LED.

8. A method for displaying a status associated with a storage device, the method to be implemented by a status-monitoring device that includes a logic unit and an expansion unit and that is electrically connected between the storage device and a light-emitting diode (LED) display unit corresponding to the storage device, the method comprising:
  (a) determining, by the logic unit, the presence of the storage device according to a first packet from the storage device;
  (b) when it is determined that the storage device is present, generating, by the expansion unit, a pulse signal according to a second packet that indicates whether the storage device is in abnormal state from the storage device;
  (c) generating, by the logic unit, a driving signal indicating the status associated with the storage device according to at least a logic level of the pulse signal received from the expansion unit; and
  (d) sending, by the logic unit, the driving signal to the LED display unit for driving the LED display unit to output an output signal by one of flashing and continuously emitting light for indicating the status associated with the storage device according to the driving signal.

9. The method of claim 8, the status-monitoring device being configured to be electrically connected to the storage device at a terminal thereof, the first packet having a first electric potential,
  wherein, in step (a), the logic unit of the status-monitoring device determines the presence of the storage device upon detecting at the terminal the first electric potential,
  wherein the method further comprises the steps of generating a driving signal indicative of non-presence of the storage device when the status-monitoring device receives at the terminal a reference signal having a second electric potential that is different from the first electric potential, and sending the driving signal indicative of non-presence of the storage device to the LED display unit for disabling the LED display unit.

10. The method of claim 8, further comprising, between steps (b) and (d), the steps of:
  (e) determining whether the pulse signal is currently at a first logic level or a second logic level; and
  (f) when it is determined that the pulse signal is at the second logic level in step (e), determining whether the pulse signal changes from being at the second logic level to being at the first logic level;
  wherein, in step (c), the status-monitoring device generates a driving signal indicating an offline status of the storage device and driving the LED display unit to output a first output signal when the determination made in step (f) is affirmative, and generates a driving signal indicating a fault status of the storage device and driving the LED display unit to output a second output signal when the determination made in step (f) is negative.

11. The method of claim 10, further comprising the steps of:
- (g) when it is determined that the pulse signal is at the first logic level in step (e), determining whether the pulse signal is at the first logic level for a first predetermined time period;
- (h) receiving from the storage device a third packet indicative of a normal status of the storage device when the determination made in step (g) is affirmative; and
- (i) implementing step (f) when the determination made in step (g) is negative.

12. The method of claim 11, further comprising, after step (h), the steps of:
- (j) determining whether the third packet has a pulse length longer than a second predetermined time period;
- (k) when the determination made in step (j) is affirmative, generating a driving signal indicative of an idle status of the storage device, and sending the driving signal indicative of the idle status to the LED display unit for driving the LED display unit to output a third output signal; and
- (l) when the determination made in step (j) is negative, generating a driving signal indicative of an access status of the storage device, and sending the driving signal indicative of the access status of the storage device to the LED display unit for driving the LED display unit to output a fourth output signal.

13. A computer system comprising:
- a storage device operable to output a first packet indicating presence of said storage device, a second packet indicating whether said storage device is in an abnormal status, and a third packet indicative of a normal status;
- a status-monitoring device including
    - a logic unit that includes a timer and that is configured to determine the presence of said storage device upon receipt of the first packet, and
    - an expansion unit that is electrically connected to said logic unit, and that is configured to receive the second packet from said storage device when the storage device is present, to generate a pulse signal according to the second packet, and to send the pulse signal to said logic unit; and
- a light-emitting diode (LED) display unit corresponding to said storage device and coupled to said logic unit;
- wherein, when determining that a logic level of the pulse signal received from said expansion unit is at a first logic level, said logic unit is to
    - drive said LED display unit to output a first output signal indicating a fault status of said storage device when further determining that the logic level of the pulse signal changes from the first logic level to a second logic level, and
    - drive said LED display unit to output a second output signal indicating an offline status of said storage device when further determining that the logic level of the pulse signal does not change;
- wherein, when determining that the logic level of the pulse signal received from said expansion unit is at the second logic level, said logic unit is to
    - initialize the timer to start timing to determine whether the pulse signal stays at the second logic level for a first predetermined time period,
    - after determining that the pulse signal stays at the second logic level for the first predetermined time period, initialize the timer to start timing upon receiving the third packet to determine whether the third packet has a pulse length longer than a second predetermined time period,
    - when determining that the pulse length of the third packet is longer than the second predetermined time period, drive said LED display unit to output a third output signal indicative of an idle status of said storage device, and
    - when determining that the pulse length of the third packet is not longer than the second predetermined time period, drive said LED display unit to output a fourth output signal indicative of an access status of said storage device.

* * * * *